United States Patent [19]

Hess et al.

[11] Patent Number: 5,313,625
[45] Date of Patent: May 17, 1994

[54] FAULT RECOVERABLE COMPUTER SYSTEM

[75] Inventors: Richard F. Hess, Glendale; Larry J. Yount, Scottsdale, both of Ariz.

[73] Assignee: Honeywell Inc., Minneapolis, Minn.

[21] Appl. No.: 738,011

[22] Filed: Jul. 30, 1991

[51] Int. Cl.$^5$ .............................. G06F 11/00
[52] U.S. Cl. .............................. 395/575; 371/12
[58] Field of Search ............... 371/12, 68.3; 395/575

[56] References Cited

U.S. PATENT DOCUMENTS

| | | | |
|---|---|---|---|
| 4,030,074 | 6/1977 | Giorcelli | 371/12 |
| 4,413,327 | 11/1983 | Sabo et al. | 371/10.1 |
| 4,751,639 | 6/1988 | Corcoran et al. | 371/12 |
| 4,751,670 | 6/1988 | Hess | 371/12 |
| 4,868,744 | 9/1989 | Reinsch et al. | 371/12 |
| 4,930,128 | 5/1990 | Suzuki et al. | 371/12 |
| 4,939,644 | 7/1990 | Harrington et al. | 395/275 |
| 4,959,774 | 9/1990 | Davis | 371/12 |
| 5,022,027 | 6/1991 | Rosario | 371/12 |
| 5,153,881 | 10/1992 | Bruckert et al. | 371/12 |
| 5,175,847 | 12/1992 | Mellott | 371/12 |

*Primary Examiner*—Charles E. Atkinson
*Attorney, Agent, or Firm*—Arthur A. Sapelli; William Udseth; A. Medved

[57] ABSTRACT

In a computer system having fault recoverable capability, there is included a first and second data processing unit (DPU), wherein each of the first and second DPU is executing the same task essentially in parallel. Each DPU comprises a processor, a memory and a protected memory. The protected memory stores system data, such that the system data stored in the protected memory is immune from transient conditions. Also included is a monitor, which is operatively connected to the monitor of the other DPU. The monitor detects the occurrence of an upset to reinitialize the DPU, the DPU being reinitialized to a condition just prior to the occurrence of the upset thus avoiding utilization of any potentially erroneous data, and thereby permitting the DPU to return to its normal processing with valid data.

14 Claims, 2 Drawing Sheets

FAULT RECOVERABLE COMPUTER SYSTEM

BACKGROUND OF THE INVENTION

The present invention relates to digital computer systems, and more particularly, to a computer system having an apparatus for monitoring redundant processors of the computer system to effectuate a recovery from correctable faults of the multi-lane digital computer system.

Digital computers are utilized to implement complex banking and business systems as well as in the control of industrial processes. The digital computer is also finding wide spread usage in the control of vehicles such as aircraft, spacecraft, marine and land vehicles. For example, in present day automatic flight control systems for commercial and military transports, the digital computer is supplanting the analog computer of earlier technology.

Automatic flight control systems are constrained by Federal Air Regulations to provide safe control of the aircraft throughout the regimes in which the automatic flight control system is utilized. Any failure condition which prevents continued safe flight and landing must be extremely improbable. Present day regulations require a probability of less than $10^{-9}$ failures per hour for flight critical components. A flight critical portion of an automatic flight control system is one, the failure of which will endanger the lives of the persons aboard the aircraft. For example, components of an automatic flight control system utilized in automatically landing the aircraft may be designated as flight critical, whereas, certain components utilized during cruise control may be designated as non-critical.

In the present day technology of digital automatic flight control systems, it is generally recognized that a digital computer including the hardware and extensive software required for a flight control system application program is of such complexity that the analysis for certification in accordance with Federal Air Regulations is exceedingly more time consuming, expensive and difficult than with the analog computer. The level of complexity and sophistication of the digital technology is increasing such that analysis and proof for certification to the stringent safety requirements is becoming more difficult. Also, it is becoming more difficult to identify all possible data paths in such systems and therefore conventional failure mode and effects analysis is essentially ineffective.

Present day digital computers include hundreds of thousands of discrete semi-conductor or integrated circuit elements generically denoted as latches. A latch, well known to those skilled in the art, is a high speed electronic device that can rapidly switch between stable states in response to relatively low amplitude, high speed signals. Latch circuits are utilized to construct most of the internal hardware of a digital computer such as logic arrays, memories, registers, control circuits, counters, arithmetic and logic units, and the like.

As a consequence, digital computers are subject to disturbances which upset the digital circuitry but do not cause permanent physical damage. For instance, since present day digital computers operate at nanosecond and subnanosecond speeds, rapidly changing electronic signals normally flow through the computer circuits, such signals radiating electro-magnetic fields that couple to circuits in the vicinity thereof. These signals can not only set desired latches into desired states, but can also set other latches into undesired states. An erroneously set latch can unacceptably compromise the data processed by the computer or can completely disrupt the data processing flow thereof. Functional error modes without component damage in digital computer based systems is denoted as digital system upset.

Digital system upset can also result from spurious electromagnetic signals such as those caused by lightning that can be induced on the internal electrical cables throughout the aircraft. Such transient spurious signals can propagate to internal digital circuitry setting latches into erroneous states. Additionally, power surges, radar pulses, static discharges and radiation from nuclear weapon detonation may also result in digital system upset. When subject to such conditions, electrical transients are induced on system lines and data buses resulting in logic state changes that prevent the system from performing as intended after the transient. Additionally, such electromagnetic transients can penetrate into the memory of the computer and scramble the data stored therein. Since such transients can be induced on wiring throughout an aerospace vehicle, reliability functions based on the use of redundant electronic equipment can also be comprised.

A digital computer is susceptible to complete disruption if an incorrect result is stored in any of the memory elements associated with the computer. These upsets increase the number of unconfirmed removals and adversely affect the MTBF/MTBUR, mean time between failure/mean time between unconfirmed removals, ratio of the computer. Safety-critical digital avionic computer applications such as fly-by-wire or autoland achieve their very high reliability numbers through the use of redundancy and cannot tolerate system upset due to transient conditions such as electromagnetic interference (EMI), inherent noise, lightning, electromagnetic pulses (EMP), high energy radio frequency (HERF) or transient radiation effects on electronics (TREE). Safety-critical digital computers must be able to tolerate such transient upsets without affecting the performance of the critical application. As newer digital technologies are introduced, the amount of energy necessary to change the state of a memory element is rapidly dropping, thereby making these elements more susceptible to upset due to EMI, lightning, EMP, HERF or TREE.

Prior redundant digital systems have provided recovery from transient disturbances to digital circuitry with a "transfusion" of data. Following the detection of a digital circuit upset, "transfused" data was transmitted from unaffected redundant digital circuits to the upset digital circuits in order to restore the upset circuitry to the correct processing state. Such a prior redundant system is comprised of three digital processing elements. If one element is determined to be faulty by the other two, it was isolated. The two remaining elements then transmitted the current long term state variables, which are specific to the digital application, to the isolated element. The isolated element then resumed processing and was readmitted to the system if the processing was performed for a given number of computation frames without another detected fault.

Thus, prior systems do not provide for the recovery of digital processing elements if all processing elements are upset by a transient disturbance. Prior systems depend on the interaction between remaining undisturbed redundant components and the upset components for error identification and correction.

Thus, there is provided by the present invention, a system which allows the digital processing system to recover from disruption of all redundant elements. Each digital processing element is able to recover from "soft" hardware faults or other "transient" type disturbances by restoring its own previous non-faulty state without interaction with other redundant elements within the digital system. Because this technique is transparent to the software function being executed on a digital processor and is independent of the level of redundancy of the digital components, system design flexibility is increased over the present day systems.

The disadvantages of the present system, are overcome by maintaining copies of present and past values of system state variables which are protected from the effects of electromagnetic environments, or other external disturbances (e.g. nuclear particles, etc.). This capability provides a needed level of immunity for critical digital avionics (such as autoland, displays or fly-by-wire) to such external environments. Specifically, following disruption of a digital processing element, an appropriate copy of each state variable, provided by that processing element, is restored from the protected memory associated with that element. With the state variable re-established at their legitimate values, data processing by the disrupted processing element is restored. In addition to protected memory, the present invention includes various monitoring options.

SUMMARY OF THE INVENTION

Thus, there is provided by the present invention, a computer system having a configuration which allows the system to recover from correctable faults of all redundant elements. In a computer system having fault recoverable capability, there is included a first and second data processing unit (DPU), wherein each of the first and second DPU is executing the same task essentially in parallel. Each DPU comprises a processor, a memory (operatively connected to the processor) for storing information, and a protected memory (operatively connected to the memory and the processor.) The protected memory stores system data, such that the system data stored in the protected memory is immune from transient conditions. Also included is a monitor, operatively connected to the processor, the memory, and the protected memory of the associated DPU, and further operatively connected to the other DPU. The monitor detects the occurrence of an upset to reinitialize the DPU, the DPU being reinitialized to a condition just prior to the occurrence of the upset thus avoiding utilization of any potentially erroneous data, and thereby permitting the DPU to return to its normal processing with valid data.

The monitor comprises an in-line monitor, for verifying data processing of the corresponding DPU is proceeding normally, and a cross-lane monitor, for comparing data generated by the DPU with the data generated by the other DPU. The monitor includes at least one specific (or special purpose) processor which is less complex than the general purpose processor (i.e., the CPU of the DPU) being monitored.

Accordingly, it is an object of the present invention to provide a computer system which allows recovery from disruption of all redundant elements.

It is another object of the present invention to provide a computer system having soft error recovery capability.

It is still another object of the present invention to provide a computer system having soft error recovery capability which permits a digital system to operate without error where a transient disturbance causes simultaneous upsets in each of the redundant processing elements.

These and other objects of the present invention will become more apparent when taken in conjunction with the following description and attached drawings, wherein like characters indicate like parts, and which drawings form a part of the present application.

DETAILED DESCRIPTION

Figure 1:
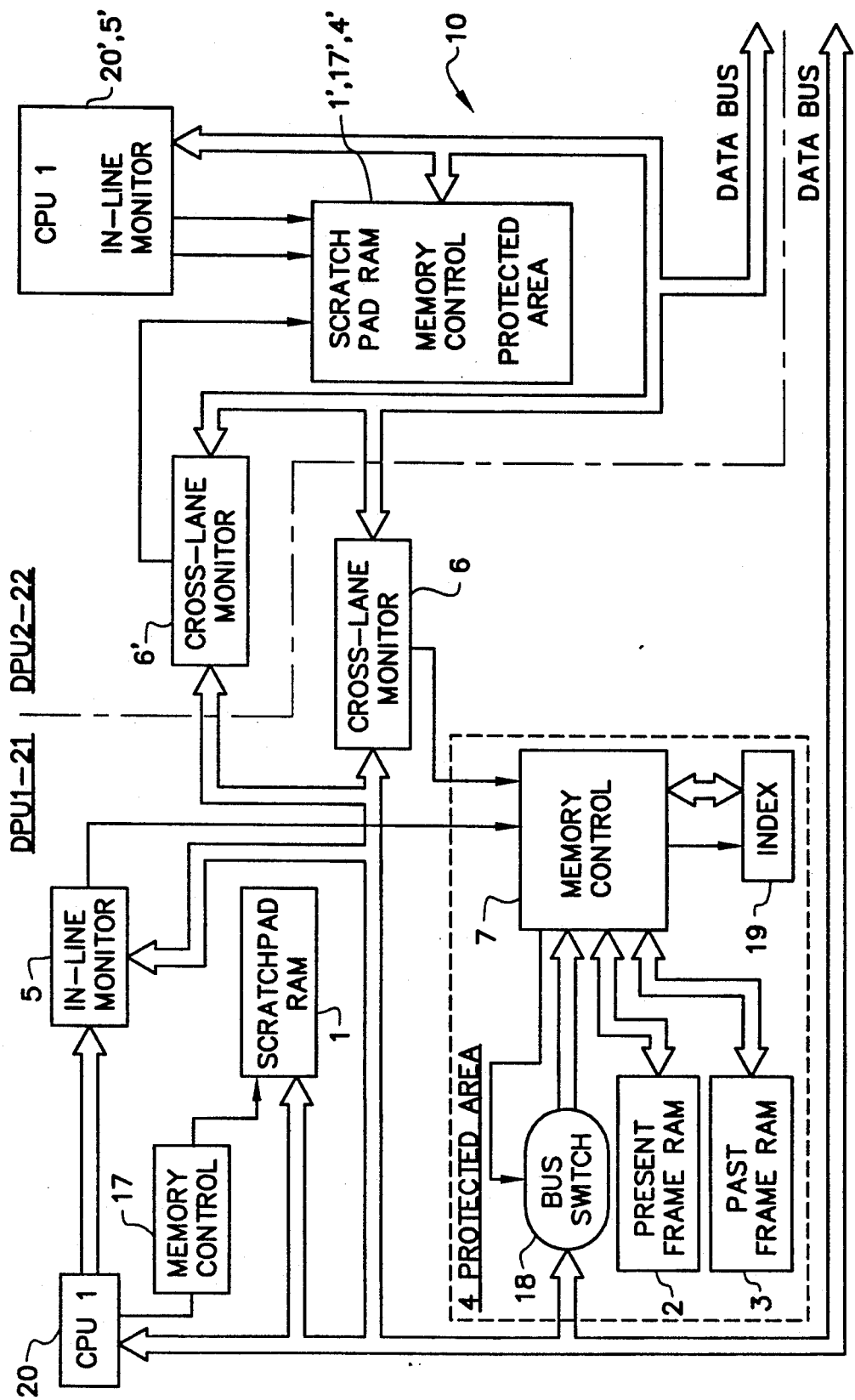
FIG. 1 shows an overview of a computer system having correctable fault recovery capability in accordance with the general concept of the present invention.

Referring to FIG. 1, there is shown an overview of a computer system 10 having the capability of recovery from correctable faults in accordance with the operation of the present invention. The computer system 10 includes redundant data processing units (DPU), DPU1 and DPU2, respectively, 21, 22. Each DPU 21, 22 includes a scratchpad RAM 1, a central processing unit (CPU) 20, a memory control 17, an in-line monitor 5, and a protected area 4. In addition, each DPU 21, 22 includes a cross-lane monitor 6 for interfacing with the other DPU. The protected area 4 of the preferred embodiment of the present invention includes a present frame RAM 2, a past frame RAM 3, a memory control 7, bus switch 18, and an index 19. The bus switch 18 and the index 19 functions as part of the memory control 7. The memory control 17 is external to the protected area 4 and function with scratchpad RAM 1. A data bus connects the various elements of the DPU and is coupled to various sensors and control elements (not shown) for receiving input data and transmitting output data to perform the predetermined function.

Each DPU 21, 22 is performing the same task, in parallel, at the same time. However, each DPU 21, 22 has its own clock so there is (as well known to those skilled in the art) a slight variation in operation (timewise) from each other, i.e., the two DPUs are not in lock-step. During normal operation of the DPUs, data is written into the scratchpad RAM 1 and into the present frame RAM 2 portion of protected area 4. The data of interest is system data which is necessary to restore the DPU to a condition prior to an upset and includes the state variables, program status words, other critical data and the like (as a function of the system), i.e., data which contains that information which would enable and control the re-instatement of data processing in a dynamic manner such that, at the system function level, there would be no perceptible or adverse effect (i.e., the recovery is transparent). A set (of the data) is written in the present frame RAM 2 each frame. Also, the data set, which is "one frame old", has been written into the past frame RAM 3. (It will be recognized that the present frame RAM 2 and/or the past frame RAM 3 can have sufficient capacity to store N-frames, i.e., more than 1 frame.)

Disruption of the operation of the DPU can occur at any time as a result a number of transient conditions as mentioned above. These transient conditions included electromagnetic interference (EMI), inherent noise, lightning, electromagnetic pulses (EMP), high energy radio frequency (HERF), or transient radiation effects on electronics. Thus, in the present invention, the data of interest necessary to recover the DPU from any upset is stored in the protected area 4. In the present invention, the protected area 4 includes the present frame RAM 2, the past frame RAM 3, and the memory control 7, housed in a shielded enclosure, including a lead housing, thereby protecting the memory elements within protected area 4 from the aforementioned transient conditions.

Figure 2:
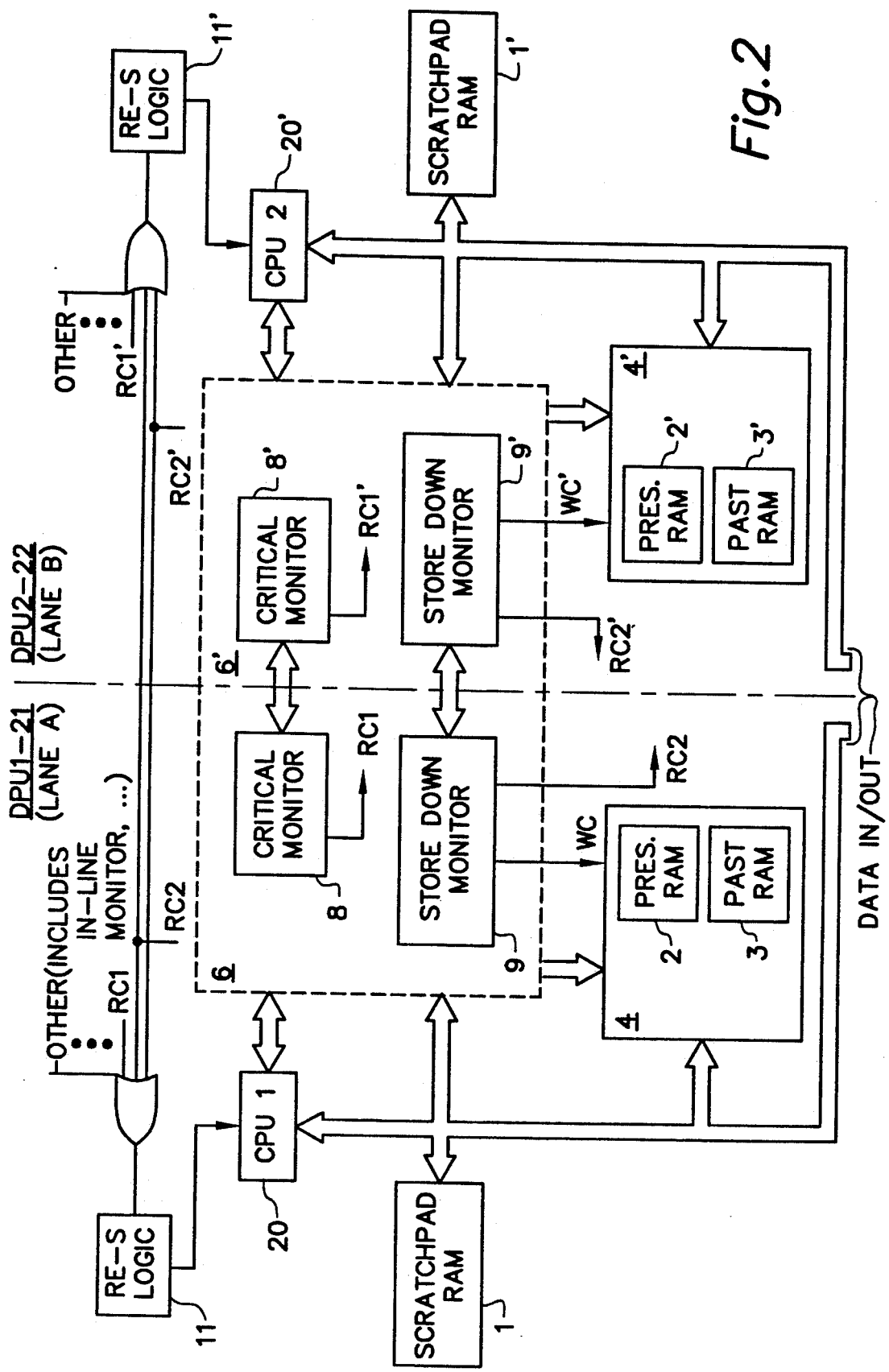
FIG. 2 shows a configuration of the computer system having correctable fault recovery capability.

Referring to FIG. 2, there is shown a configuration of the computer system 10 having correctable fault recovery capability, wherein the computer system has a multiple processor configuration. As mentioned above, during each computational frame, data input from sources within or from outside the DPU is being processed. As the data is processed, the computed data is compared by a storedown monitor 9 and transferred to the present frame RAM 2. At the end of the present computational frame, the data stored in the present frame RAM 2 has been validated by the storedown monitor, the Index 19 is incremented, and the present frame RAM 2 becomes past frame RAM 3. In the present invention, the next frame is calculating new data and storing the new data into a new present frame RAM 2. Writing to different regions of memory utilizing pointers/indexed displacement of starting address for defining memory regions occurs in a manner well know to those skilled in the art. DPU1 21 and DPU2 22 are each performing the same tasks in parallel. The computed data is relatively slow varying compared to the frequency of the computational frame, in the preferred embodiment.

In the event of an upset (i.e., a disruption) in the DPU operation, data being written into the protected area 4, i.e., the present frame RAM 2, is treated as erroneous and as a result no further data is written into the protected area 4. For certain applications the probability of detection of a processor (CPU) disruption within the computational frame that it occurs must be maximized. The primary cross-lane monitor 6, for detecting an upset before it can compromise several frames of data, is the storedown monitor (9). This monitor assures that data for both CPUs agrees within the appropriate threshold criteria before a storedown to the protected area 4 can occur. If the storedown threshold criteria is not met, a processor disruption is declared and a recovery sequence is initiated. The critical monitor 8, 8' compares system output variables. The critical monitor 8, 8' initiates system recovery in the event of a non-detected fault (i.e., output variable comparison to drift beyond its threshold criteria).

The DPU disruption is detected by the in-line monitor 5 or the cross-lane monitor 6. The in-line monitor 5 checks that program execution is proceeding normally, reasonableness of address counter, watch-dog time, memory-protect was not violated, . . . . It will be recognized that some of these functions can be hardware and/or software, and also that the in-line monitor 5 function can be implemented as part of CPU 1 or can be a separate unit. The in-line monitor 5 is unique to each DPU.

The cross-lane monitor 6 includes a critical monitor 8 and a storedown monitor 9. The critical monitor 8 checks, at a global function level, system performance criteria, that predetermined status words for the two CPUs are correct, system output variables between the two DPUs are not beyond predetermined criteria, . . . in a manner well known to those skilled in the art. If an error is detected by the critical monitor, a recovery control signal (RC1, RC1') is generated. The storedown monitor 9 checks the data of the two CPUs 20, 20'. Within (or part of) the computational frame, the storedown monitor 9 obtains and compares computed data from the two CPUs 20, 20' with a substantially tighter tolerance than that of the critical monitor 8. If the data compares, the data is stored in the respective present frame RAM 2, 2' under control of a write control signal WC from the storedown monitor 9. If an error is detected, a recovery control signal (RC2, RC2') is generated by the respective storedown monitor 9. Because of the currency of the data compared by the storedown monitor 9, recovery is transparent. Once again, it will be understood by those skilled in the art that the critical monitor 8 and storedown monitor can be implemented in separate units each containing a processor element to perform the described functions, the processor elements being specific (or special purpose) processors which are less complex than the CPUs which they monitor.

Each DPU 21, 22 includes restart logic (RE-S) 11, 11' which forces the respective CPU 20, 20' to stop executing, initialize control memory locations and bootstrap the CPU. Such restart logic units 11 are well known to those skilled in the art. During the recovery sequence, data is read from the appropriate sets of previous frame data that has been stored in the protected area 4. The protected area (4) data provides the system re-initialization state for rapid restart of the digital processor data processing cycle. The reinstatement of data processing is fast relative to system response such that the recovery process is transparent to system functionality. In addition to providing logic to trigger the recovery sequence, the cross-lane monitor 6 also provides the enable logic to the memory control 7 such that data can be written to the present frame RAM 2 within the protected area 4. The enable is issued for the storage of each data entry only when the data associated with that entry is within the cross-lane monitor 6 threshold.

The detection of a disruption cause error signals RC1, RC1', RC2, RC2', and/or OTHER to be generated as discussed above. Some error signals such as RC1 and RC2 are coupled across lanes, i.e., to both DPUs, while other error signals (such as OTHER, including the error signal from the in-line monitor) stay within the DPU. Upon the detection of a disruption in CPU (or DPU) operation, the CPU is vectored into a re-initialization and restart operating mode. State variable data corresponding to those stored in the protected area 4 are restored. All other state variables are initiated to their initial condition. If the processing disruption, continues to persist and causes further cycling through the vector to re-initialize and restart, after an appropriate number of processing resumption attempts, the digital processor would be disabled in an appropriate manner. The count being accumulated for determining the processor to be invalid would not be cleared to zero unless an appropriate number of uninterrupted successful cycles of software execution have been accomplished (the criteria for number of processing resumption attempts and of successful cycles of software execution would depend upon the particular application). Accordingly, a fault recovery system is prevented from degrading the basic system functionality.

While there has been shown what is considered the preferred embodiment of the preset invention, it will be manifest that many changes and modifications can be made therein without departing from the essential spirit and scope of the invention. It is intended, therefore, in the annexed claims, to cover all such changes and modifications which fall within the true scope of the invention.

We claim:

1. In a computer system having fault recoverable capability, and including a first and second data processing unit (DPU), wherein each of said first and second DPU is executing the same task essentially in parallel, each DPU comprising:
   a) processing means;
   b) memory means, operatively connected to said processing means, for storing information;
   c) protected memory means, operatively connected to said memory means and to said processing means, for storing system data, wherein said system data stored in said protected memory means is immune from transient conditions; and
   d) monitor means, operatively connected to said processing means, said memory means, and said protected memory means of the associated DPU, and further wherein the monitor means of the first DPU is operatively connected to said second DPU and wherein the monitor means of the second DPU is operatively connected to the first DPU, for detecting the occurrence of an upset within the computer system to reinitialize the corresponding DPU, the DPU being reinitialized by said system data from the protected memory means of the corresponding DPU to a condition just prior to the occurrence of the upset thus avoiding utilization of any potentially erroneous data, and thereby permitting the DPU to return to its normal processing with valid data.

2. In a computer system having fault recoverable capability according to claim 1, wherein said monitor means comprises:
   a) in-line monitor means, operatively connected to the corresponding DPU, for verifying data processing of the corresponding DPU is proceeding normally; and
   b) cross-lane monitor means, operatively connected to the corresponding DPU and to the cross-lane monitoring means of the other DPU, for comparing predetermined data generated by the DPU with the predetermined data generated by the other DPU.

3. In a computer system having fault recoverable capability according to claim 2, wherein said protected memory means comprises:
   a) first memory means, for storing recovery information associated with a present computational frame;
   b) second memory means, for storing recovery information associated with at least one previous computational frame; and
   c) memory control means, for controlling the storage of recovery information in said first memory means and said second memory means upon error-free completion of the currently executing computational frame in response to a write control signal from said monitor means.

4. In a computer system having fault recoverable capability according to claim 3, wherein said cross-lane monitor means comprises:
   a) first monitor means for verifying errorless DPU system performance; and
   b) second monitor means for comparing computer data between the DPUs, said monitor means generating an error signal if predetermined criteria of the verifying or comparing function have not been met.

5. In a computer system having fault recoverable capability according to claim 4, wherein said monitor means further comprises: logic means, operatively connected to data processing means, memory means, and protected memory means, for reinitializing said DPU in response to a recovery control signal.

6. In a computer system having fault recoverable capability according to claim 2, wherein said monitor means further comprises: logic means, operatively connected to said processing means, memory means, and protected memory means, for reinitializing said DPU in response to a recovery control signal.

7. In a computer system having fault recoverable capability according to claim 5, wherein said monitor means includes at least one specific processing means, said specific processing means being less complex than said processing means.

8. In a computer system having fault recoverable capability, and including at least a first and second data processing unit (DPU), wherein each of said first and second DPU is executing the same task essentially in parallel, each DPU comprising:
   a) processing means;
   b) memory means, operatively connected to said processing means, for storing information;
   c) protected memory means, operatively connected to said memory means and to said processing means, for storing system data, wherein said system data stored in said protected memory means is immune from transient conditions; and
   d) monitor means, operatively connected to said processing means, said memory means, and said protected memory means of the associated DPU, and further operatively connected to each of said other DPUs, for detecting the occurrence of an upset within the computer system to reinitialize the corresponding DPU, the DPU being reinitialized by said system data from the protected memory means of the corresponding DPU to a condition just prior to the occurrence of the upset thus avoiding utilization of any potentially erroneous data, and thereby permitting the DPU to return to its normal processing with valid data.

9. In a computer system having fault recoverable capability according to claim 8, wherein said monitor means comprises:
   a) in-line monitor means, operatively connected to the DPU, for verifying data processing of the corresponding DPU is proceeding normally; and
   b) cross-lane monitor means, operatively connected to the corresponding DPU and to each of the cross-lane monitoring means of the other DPUs, for comparing predetermined data generated by the DPU with the predetermined data generated by the other DPUs.

10. In a computer system having fault recoverable capability according to claim 9, wherein said protected memory means comprises:
    a) first memory means, for storing recovery information associated with a present computational frame;

b) second memory means, for storing recovery information associated with at least one previous computational frame; and c) memory control means, for controlling the storage of recovery information in said first memory means and said second memory means upon error-free completion of the currently executing computational frame in response to a write control signal from said monitor means.

11. In a computer system having fault recoverable capability according to claim 10, wherein said cross-lane monitor means comprises:

a) first monitor means for verifying errorless DPU system performance; and b) second monitor means for comparing computer data between the DPUs, said monitor means generating an error signal if predetermined criteria of the verifying or comparing function have not been met.

12. In a computer system having fault recoverable capability according to claim 11, wherein said monitor means further comprise: logic means, operatively connected to said processing means, memory means, and protected memory means, for reinitializing said DPU in response to a recovery control signal.

13. In a computer system having fault recoverable capability according to claim 9, wherein said monitor means further comprise: logic means, operatively connected to said processing means, memory means, and protected memory means, for reinitializing said DPU in response to a recovery control signal.

14. In a computer system having fault recoverable capability according to claim 12, wherein said monitor means includes at least one specific processing means, said specific processing means being less complex than said processing means.

* * * * *